(12) United States Patent
Slots et al.

(10) Patent No.: US 11,752,718 B2
(45) Date of Patent: Sep. 12, 2023

(54) BEAD RETAINING MEMBER, BEAD RETAINING DEVICE AND BEAD HANDLING ASSEMBLY

(71) Applicant: VMI HOLLAND B.V., Epe (NL)

(72) Inventors: Antonie Slots, Epe (NL); Evert Doppenberg, Epe (NL)

(73) Assignee: VMI Holland B.V., Epe (NL)

( * ) Notice: Subject to any disclaimer, the term of this patent is extended or adjusted under 35 U.S.C. 154(b) by 0 days.

(21) Appl. No.: 17/781,847

(22) PCT Filed: Nov. 9, 2020

(86) PCT No.: PCT/EP2020/081461
§ 371 (c)(1),
(2) Date: Jun. 2, 2022

(87) PCT Pub. No.: WO2021/110364
PCT Pub. Date: Jun. 10, 2021

(65) Prior Publication Data
US 2023/0001659 A1    Jan. 5, 2023

(30) Foreign Application Priority Data
Dec. 2, 2019   (NL) ...................................... 2024349

(51) Int. Cl.
*B29D 30/32*   (2006.01)
*B29D 30/48*   (2006.01)
*B29D 30/00*   (2006.01)

(52) U.S. Cl.
CPC ...... *B29D 30/48* (2013.01); *B29D 2030/0044* (2013.01); *B29D 2030/3207* (2013.01); *B29D 2030/487* (2013.01)

(58) Field of Classification Search
CPC ........ B29D 30/18; B29D 30/32; B29D 30/48; B29D 2030/0044; B29D 2030/3207
See application file for complete search history.

(56) References Cited

U.S. PATENT DOCUMENTS

| 4,689,106 A | 8/1987 | Becht et al. |
| 5,735,995 A * | 4/1998 | Bull ....................... B29D 30/48 156/130.7 |

(Continued)

FOREIGN PATENT DOCUMENTS

| CN | 1751873 A | 3/2006 |
| CN | 109421298 A | 3/2019 |

(Continued)

OTHER PUBLICATIONS

Office Action from corresponding Japanese Application No. 2021-519810, dated May 24, 2022.

(Continued)

*Primary Examiner* — Geoffrey L Knable
(74) *Attorney, Agent, or Firm* — WORKMAN NYDEGGER

(57) ABSTRACT

A bead retaining member includes a body having a concave first concave edge and one or more retaining elements which are distributed over the body along said first concave edge for retaining a first bead of a first size along a first retaining curve having a first retaining radius and for retaining a second bead of a second size along a second retaining curve having a second retaining radius larger than the first retaining radius. The first retaining curve intersects with the second retaining curve at a first intersection point and a second intersection point. The first concave edge is non-circular and is located radially outside of the second retaining curve in a center region of the first concave edge between the first intersection point and the second intersection point and radially outside of the first retaining curve in a first lateral region and a second lateral region.

25 Claims, 13 Drawing Sheets

(56) References Cited

U.S. PATENT DOCUMENTS

| | | | |
|---|---|---|---|
| 5,858,165 A | 1/1999 | Takasuga | |
| 6,182,731 B1 * | 2/2001 | Urayama | B29D 30/0016 156/406.2 |
| 8,214,964 B1 * | 7/2012 | Coleman | A47L 13/022 114/221 R |
| 8,499,943 B1 * | 8/2013 | Neldner | A47J 45/02 211/DIG. 1 |
| 2017/0348933 A1 | 12/2017 | Lundell et al. | |
| 2019/0070811 A1 | 3/2019 | Stoila et al. | |
| 2019/0070812 A1 | 3/2019 | Stoila et al. | |
| 2023/0001659 A1 | 1/2023 | Slots et al. | |

FOREIGN PATENT DOCUMENTS

| | | | |
|---|---|---|---|
| CN | 109421302 A | | 3/2019 |
| CN | 214354344 U | | 10/2021 |
| DE | 2917219 A1 | | 11/1980 |
| EP | 0786328 A2 | | 7/1997 |
| JP | H09201883 A | | 8/1997 |
| JP | 2003145644 A | | 5/2003 |
| JP | 2004-345168 A | * | 12/2004 |
| JP | 2009248498 A | | 10/2009 |
| JP | 2014213484 A | | 11/2014 |

OTHER PUBLICATIONS

Decision to Grant Patent in corresponding Japanese Application No. 2021-519810, dated Aug. 25, 2022.

International Search Report from PCT Application No. PCT/EP2020/081461, dated Jan. 29, 2021.

Search Report from corresponding Netherlands Application No. NL2024349, dated Jul. 22, 2020.

Office Action from Chinese Application No. 202011386919.0, dated Dec. 2, 2022.

* cited by examiner

BEAD RETAINING MEMBER, BEAD RETAINING DEVICE AND BEAD HANDLING ASSEMBLY

BACKGROUND

The invention relates to a bead retaining member, a bead retaining device comprising said bead retaining member and a bead handling assembly comprising said bead retaining device.

U.S. Pat. No. 5,858,165 A discloses a mechanism for retaining a bead with filler. The mechanism comprising: a ring body; a plurality of extending/retracting means which are separately provided at the ring body at equal intervals in the circumferential direction of the ring body and an arc-shaped retaining body which is provided at each of the plurality of the extending/retracting means and which can retain a bead with a filler. The retaining body is provided with a plurality of permanent magnets to retain a bead with a filler. The extending/retracting means further includes a pair of swing links which are separately disposed in the radial direction of the ring body, and the base end portions of the swing links being rotatably connected to the ring body; and a connecting link which is rotatably connected to each of the distal end portions of the pair of swing links. The retaining body is provided at the inner end portion of the connecting link such that, when the extending/retracting means is driven, all of the plurality of the retaining bodies are positioned on the same circle which centers around the central axis of the ring body.

Even if all of the retaining bodies slightly move from the predetermined positions in the radial direction of the ring body to the radial direction outer side or to the radial direction inner side, the line through the connecting link practically intersects the central axis of the ring body. Hence, beads with fillers having slightly different radii thus can be retained with the same retaining bodies. In a case in which the radius of the retaining bead with the filler is changed considerably, the retaining bodies are replaced by alternative retaining bodies having a radius of curvature that is closer to the radius of the bead to be retained.

SUMMARY OF THE INVENTION

A disadvantage of the known mechanism for retaining a bead is that the retaining body has a constant radius of curvature. This is fine when the radii of the beads to be retained only vary slightly. However, when the variation is relatively large, the radius of curvature no longer corresponds to the curvature of the bead to be retained. When the radius of curvature of the retaining body is too large or too small for the bead to be retained, the retaining body may extend radially inside the inner contour of the bead where it may interfere with the placement of the bead on a drum or it may only partially retain the bead along its retaining surface, as shown in FIGS. 7A, 7B and 7C. Consequently, only beads with a slightly different radius can be retained reliably.

It is an object of the present invention to provide a bead retaining member, a bead retaining device comprising said bead retaining member and a bead handling assembly comprising said bead retaining device, wherein beads with different radii can be retained more reliably.

According to a first aspect, the invention provides a bead retaining member for retaining a bead in a retaining plane, wherein the bead retaining member comprises a body having a concave first concave edge extending in said retaining plane, wherein the bead retaining member further comprises one or more retaining elements which are distributed over the body along said first concave edge, for retaining a bead of a first size along a first retaining curve having a first retaining radius and for retaining a bead of a second size along a second retaining curve having a second retaining radius larger than the first retaining radius, wherein the first retaining curve intersects with the second retaining curve at a first intersection point and a second intersection point spaced apart from the first intersection point, wherein the first concave edge is non-circular and is located radially outside of the second retaining curve in a center region of the first concave edge between the first intersection point and the second intersection point and radially outside of the first retaining curve in a first lateral region of the first concave edge opposite the center region with respect to the first intersection point and a second lateral region of the first concave edge opposite to the center region with respect to the second intersection point.

The bead retaining member, together with a plurality of similar or identical bead retaining members, can be positioned at a radius corresponding to a bead to be retained. The non-circularity of the first concave edge enables the bead retaining member to retain beads of different radii. In particular, the bead retaining member is arranged for retaining a first bead with a first bead radius along the first retaining curve and for retaining a second bead with a second bead radius, larger than the first bead radius, along the second retaining curve. Both beads, and any bead with a radius between the first bead radius and the second bead radius, can be retained with the same bead retaining member, without requiring replacement of said bead retaining member by an alternative bead retaining member. In both cases, the body of the bead retaining member does not extend within the contour or the inner radius of the respective bead. Hence, interference with the tire building drum or other components of a bead handling assembly can be prevented. More specifically, as the first concave edge is located radially outside the first retaining curve in the lateral regions and radially outside the second retaining curve in the center region, the first concave edge does not extend inside of or radially inwards beyond the inner edge of the first bead or the second bead. Thus, damage to the tire building drum or tire components supported thereon can be prevented.

In one embodiment the first concave edge is at least partially concentric to the first retaining curve in the center region. Additionally or alternatively, the first concave edge is at least partially concentric to the second retaining curve in the first lateral region and/or the second lateral region. In this way, the first retaining curve can be as close as possible to or coincide with the first concave edge at the center region and/or the lateral regions. More in particular, the one or more retaining elements can be placed as close as possible to the first concave edge to reliably retain the bead along the first or second retaining curve as close as possible to the first concave edge.

In a further embodiment the second retaining radius is at least five percent larger than the first retaining radius, and preferably at least ten percent. The greater the difference in radii, the greater the range of beads that can be retained to said bead retaining member.

In a further embodiment the first concave edge in the center region extends along the first retaining curve within a range of less than three millimeters from said first retaining curve. Additionally or alternatively, the first concave edge in the first lateral region and/or the second lateral region extends along the second retaining curve within a range of less than three millimeters from said second retaining curve. Again, in this way, the first retaining curve can be as close as possible to or coincide with the first concave edge at the center region and/or the lateral regions. More in particular, the one or more retaining elements can be placed as close as possible to the first concave edge to reliably retain the bead along the first or second retaining curve as close as possible to the first concave edge.

In a further embodiment the first concave edge is symmetrical in the first lateral region and the second lateral region about a plane of symmetry in the center region. Because of the symmetry, the bead can be retained reliably and/or uniformly across the width of the bead retaining member.

In a further embodiment the first retaining curve has a first middle ordinate, wherein the second retaining curve has a second middle ordinate that is in-line with the first middle ordinate. Preferably, the second middle ordinate only partially overlaps with the first middle ordinate. In other words, both retaining curves are aligned and/or centered with respect to each other.

In a further embodiment the body further comprises a second concave edge extending in the retaining plane. Preferably, the body is rotatable about an inverting axis perpendicular to the retaining plane such that the first concave edge and the second concave edge can interchange positions. The second concave edge may have retaining curves with different radii to retain beads with different bead radii. Hence, when the radii of the retaining curves are chosen correctly, the range of beads that can be retained to the same bead retaining member can be increased significantly.

In a further embodiment the one or more retaining elements are magnets, preferably permanent magnets. The beads typically contain ferromagnetic material. Hence, the magnets can effectively retain the beads to the bead retaining member.

According to a second aspect, the invention provides a bead retaining device comprising a bead retaining member according to the embodiment of the first aspect of the invention that introduced the inverting axis, wherein the bead retaining device further comprises an annular frame extending circumferentially about a central axis perpendicular to the retaining plane, wherein the bead retaining device comprises a mounting member for receiving the bead retaining member at the frame in at least two orientations about the inverting axis, wherein the bead retaining member is movable between a fixed state in which the orientation of the bead retaining member about the inverting axis is fixed with respect to the mounting member and a partially loosened state in which the bead retaining member is rotatable about the inverting axis relative to the mounting member.

By not loosening the fastener completely, the bead retaining member can remain connected to the mounting member and/or the frame while it is rotated into a different orientation. Hence, accidental release of the bead retaining members from the frame can be prevented.

In an embodiment thereof, the bead retaining member is movable with respect to the frame in a direction transverse to the retaining plane, wherein the bead retaining device further comprises one or more biasing members for biasing the bead retaining member away from the frame in a direction transverse to the retaining plane. Thus, when the bead retaining member encounters an obstacle, e.g. when the bead retaining member is misaligned with respect to a tire building drum, said bead retaining member can be displaced with respect to the frame. Hence, damage to the retaining member or the obstacle can be prevented. Preferably, a displacement sensor is placed between the biasing member and the frame. Thus, an excessive movement of one of the bead retaining member with respect to the frame can be detected and the movement of the beading retaining device can be interrupted automatically in response to said detection.

In a further embodiment the bead retaining device comprises a fastener for fixing and partially loosening the bead retaining member with respect to the mounting member. Preferably, the fastener is a bolt. The bead retaining member can thus be allowed to move into the partially loosened state by loosening the fastener, i.e. by partially unscrewing the bolt.

In alternative embodiment thereof the bead retaining device comprises a fastener for mounting the bead retaining member to the mounting member, wherein the bead retaining member is movable with respect to the fastener between the fixed state and the partially loosened state, wherein the bead retaining device further comprises a biasing member for biasing the bead retaining member into the fixed state. Preferably, the fastener is a bolt and/or the biasing member is a spring. An operator can conveniently move the bead retaining member relative to the mounting member against the force of the biasing member to allow for the reorientation of said bead retaining member. Once, the bead retaining member is correctly positioned, the operator can let go of the bead retaining member to allow the bead retaining member to return to the fixed state.

According to a third aspect, the invention provides a bead retaining device comprising a plurality of bead retaining members according to any of the aforementioned embodiments of the first aspect of the invention, wherein the bead retaining device further comprises an annular frame extending circumferentially about a central axis perpendicular to the retaining plane, wherein the frame has an inner frame edge that forms a frame opening for receiving a tire building drum, wherein the bead retaining members are movable in a radial direction perpendicular to the central axis between a first radial position at or inside the frame opening and a second radial position radially inward with respect to said first radial position, wherein the first retaining curve is concentric to the central axis in one radial position of the bead retaining members between the first radial position and the second radial position and the second retaining curve is concentric to the central axis in another radial position between the first radial position and the second radial position.

The retaining curves can thus be optimized for specific radial positions for retaining the first bead with the first bead radius, the second bead with the second bead radius and any beads with a bead radius between the first bead radius and the second bead radius.

In one embodiment the bead retaining device further comprises a drive assembly for driving the plurality of bead retaining members relative to the frame in a radial direction. Preferably, the drive assembly comprises a plurality of linear actuators for driving the movement of each of the bead retaining members in the radial direction. More preferably, each of the linear actuators comprises a set of a pinion and a rack mounted between the frame and a respective one of the bead retaining members. Most preferably, the drive assembly further comprises a plurality of planet gears, each associated with a respective one of the pinions, and a ring gear for driving said planet gears. The interaction between the planet gears and the ring gear allows for the radial movement of the bead retaining members to be synchronized.

According to a fourth aspect, the invention provides a bead handling assembly comprising the bead retaining device according to any one of the embodiments according to the second aspect of the invention and a tire building drum that has an outer diameter, wherein the first radial position and the second radial position are both located in the frame opening inside the inner frame edge and outside the outer diameter. The bead retaining members can thus effectively retain a bead in the range from inner edge up to the outer diameter of the tire building drum.

Preferably, the bead handling assembly further comprises a bead loader for supplying the beads to the bead retaining device. The bead loader can effectively pick up the bead and/or bead-apex from an upstream bead-apex manufacturing station and transfer said picked up bead or bead-apex to the bead retaining device.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
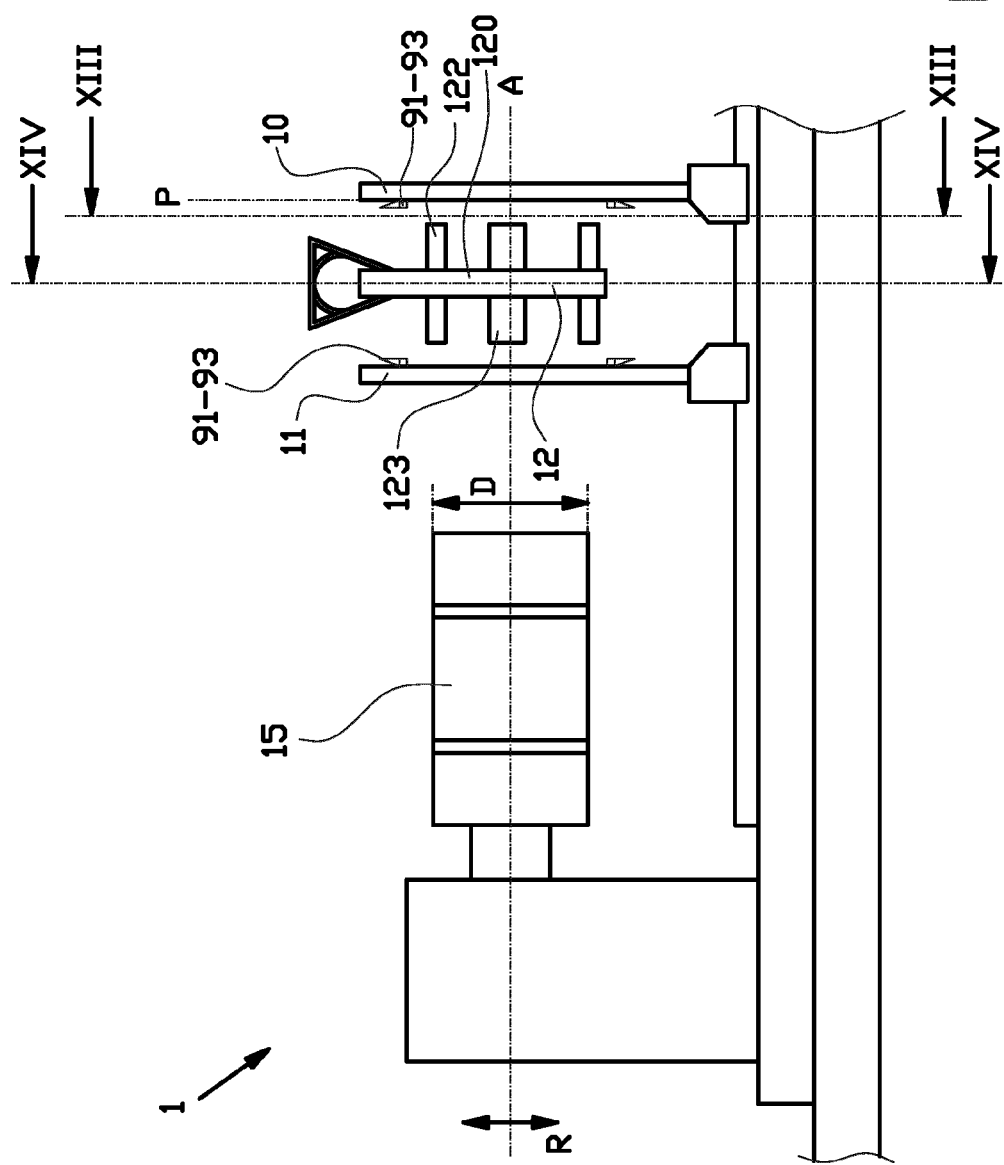
FIG. 1 shows a front view of a bead handling assembly comprising a bead loader, a first bead setter and a second bead setter according to a first embodiment of the present invention.

FIG. 1 shows a bead handling assembly 1 for handling beads or bead-apexes 91-93 of different radii or diameters according to an exemplary first embodiment of the present invention.

The bead handling assembly 1 comprises a first bead setter or bead retaining device 10 and a second bead setter or bead retaining device 11 for retaining the beads 91-93. The bead handling assembly 1 further comprises a bead loader or a bead transfer device 12 for receiving the beads 91-93 from a bead-apex manufacturing station (not shown) and for supplying the beads 91-93 to the bead retaining devices 10, 11.

Once the beads 91-93 are retained to the bead retaining devices 10, 11, said bead retaining device 10, 11 can be moved into a position in which the retained beads 91-93 are concentrically positioned over a tire building drum or a tire shaping drum 15. The tire building drum 15 has an outer diameter D.

In FIGS. 2-6, the first bead retaining device 10 is shown in more detail. The second bead retaining device 11 is similar or identical to the first bead retaining device 10 and will not be discussed in detail hereafter.

Figure 2:
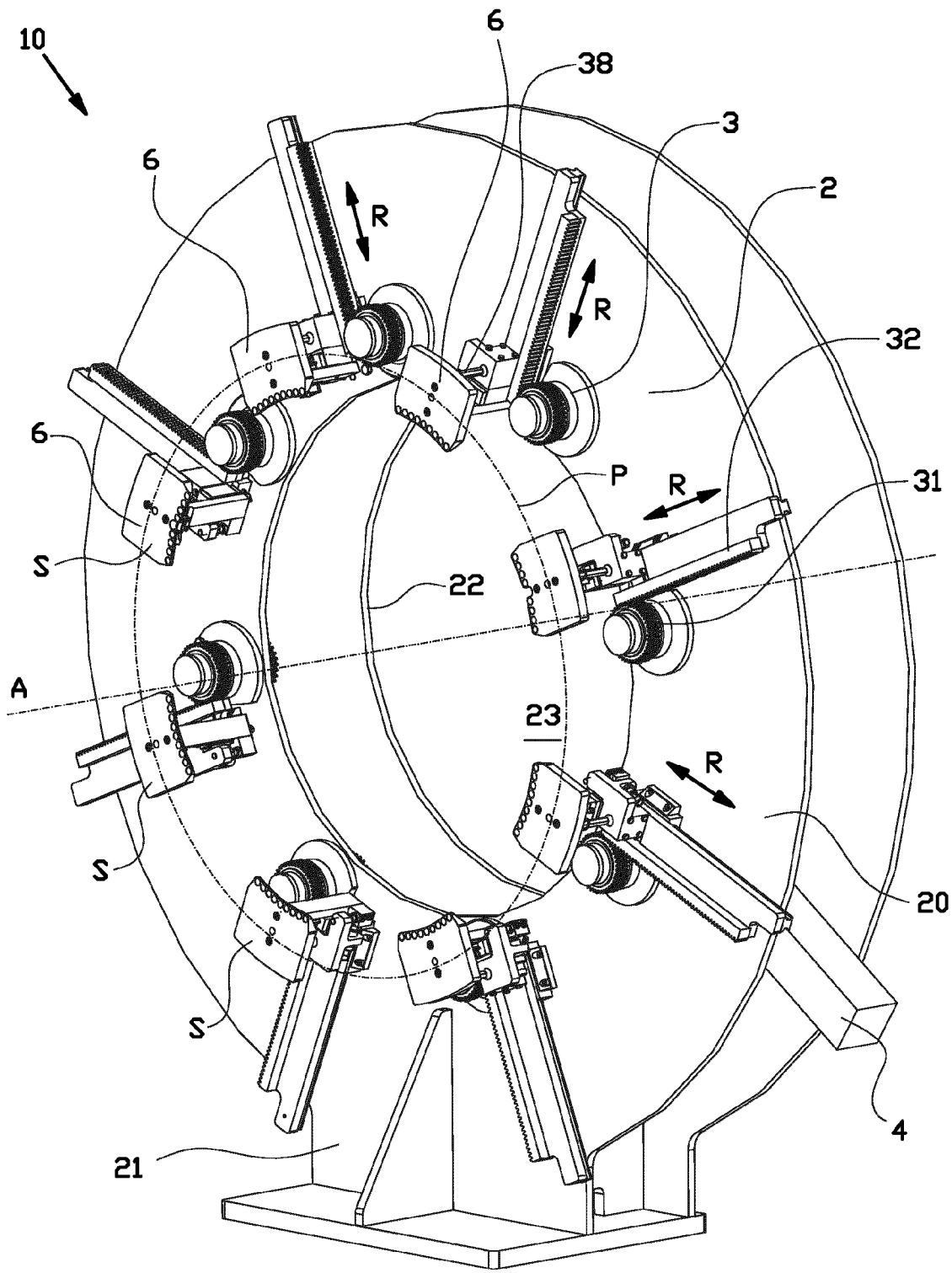
FIG. 2 shows an isometric view of the first bead setter according to FIG. 1.
Figure 3:
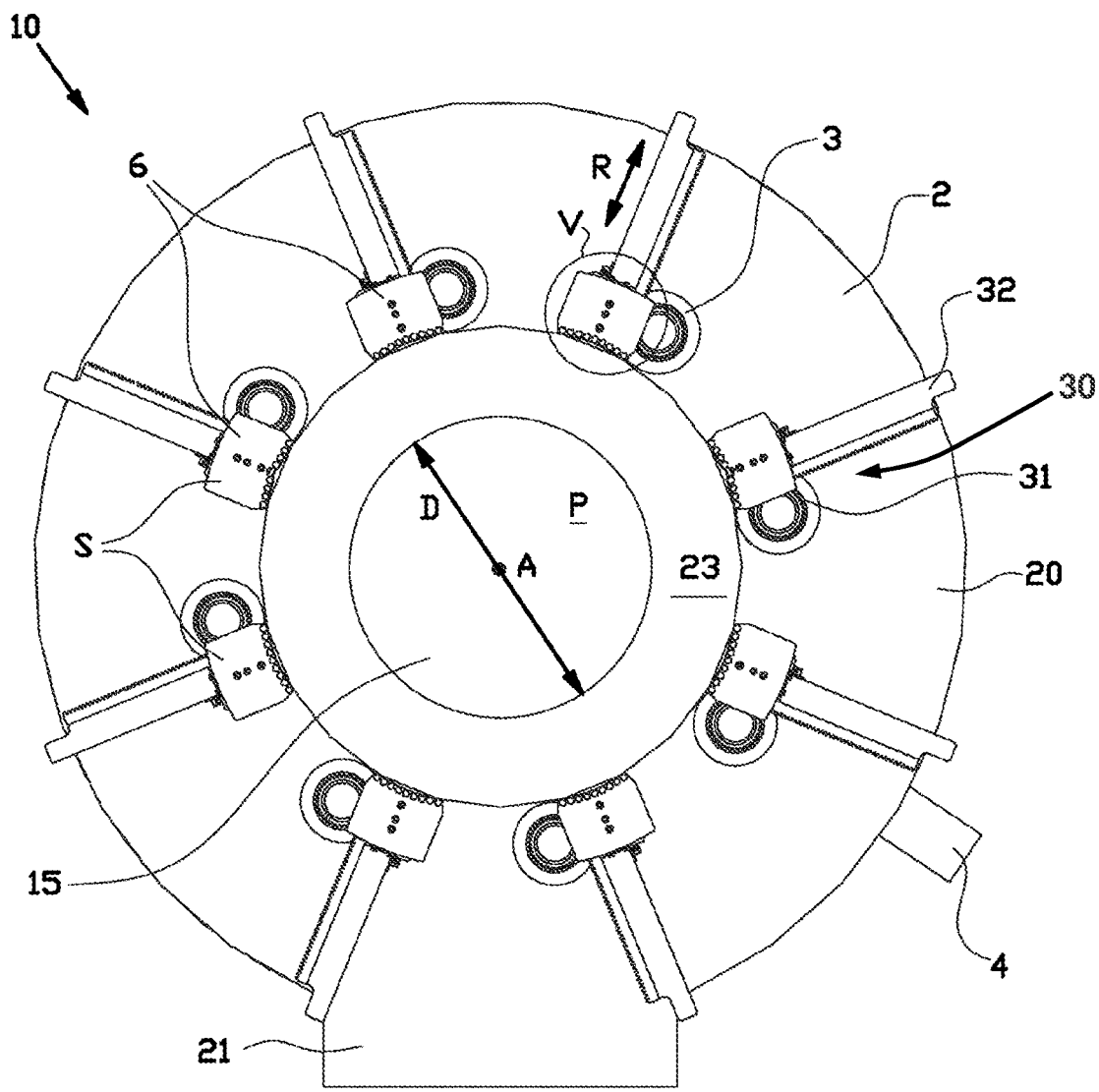
FIG. 3 shows a front view of the first bead setter with a plurality of bead retaining members which are positioned in a first operational position.
Figure 4:
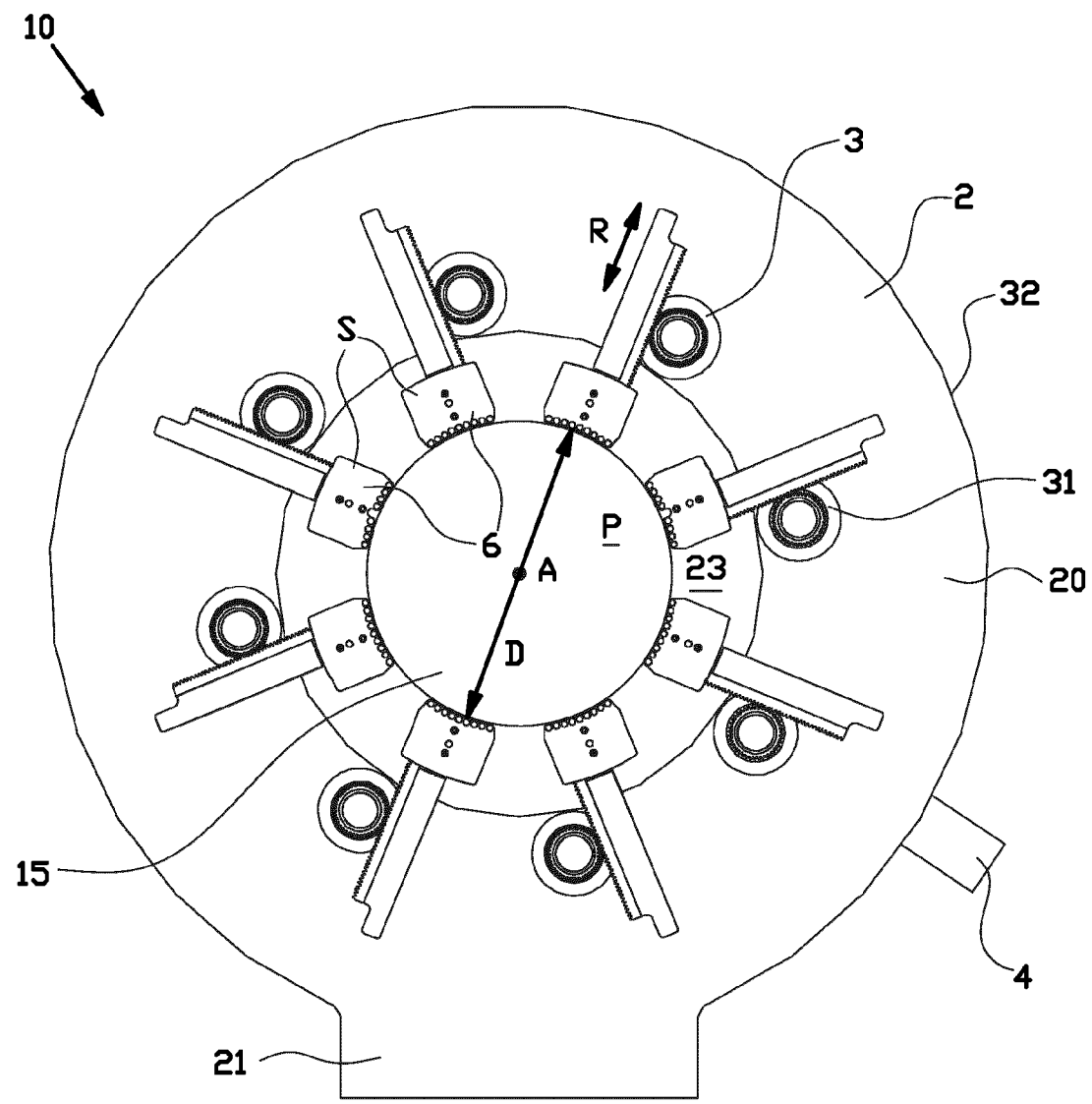
FIG. 4 shows the front view of the first bead retaining device according to FIG. 3, in which the bead retaining members have been moved into a second operational position.

As shown in FIGS. 2, 3 and 4, the first bead retaining device 10 comprises an annular or ring-like frame 2 extending circumferentially and/or concentrically about a central axis A and a frame base 21 for supporting the frame 2 with respect to a factory floor. The frame body 20 comprises an inner frame edge 22 facing towards the central axis A. The inner frame edge 22 forms a frame opening 23 in said frame body 20 for receiving the tire building drum 15 there through.

The first bead retaining device 10 further comprises a plurality of bead retaining members 6 supported by said frame 2. The bead retaining members 6 are distributed circumferentially about the central axis A. Each bead retaining member 6 is provided with a retaining surface S for retaining one of the beads 91-93. The retaining surfaces S of the plurality of bead retaining members 6 all extend in a common plane, i.e. a retaining plane P. The retaining plane P extends perpendicular to the central axis A. The bead retaining members 6 are movable relative to the frame 2 in said retaining plane P in a radial direction R perpendicular to the central axis A. The bead retaining members 6 are movable back and forth in said radial direction R between a first radial position, as shown in FIG. 3, and a second radial position, as shown in FIG. 4, radially inward with respect to said first radial position. In said second radial position, the bead retaining members 6 are at least partially positioned radially inward with respect to the inner frame edge 22. Preferably, in said second radial position, the bead retaining member 6 are positioned at or near the diameter D of the tire building drum 15.

Figure 7A:
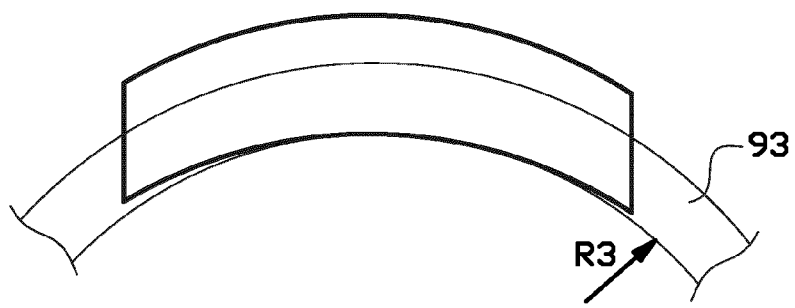
FIGS. 7A-7C show the interaction of a bead retaining member according to the prior art with beads of different radii.
Figure 7B:
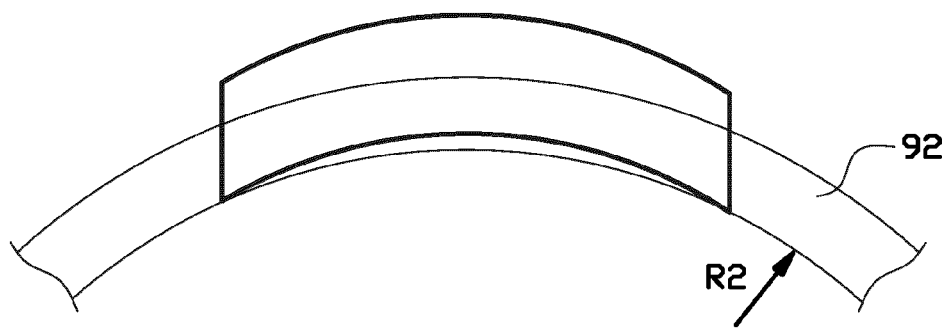
Figure 7C:
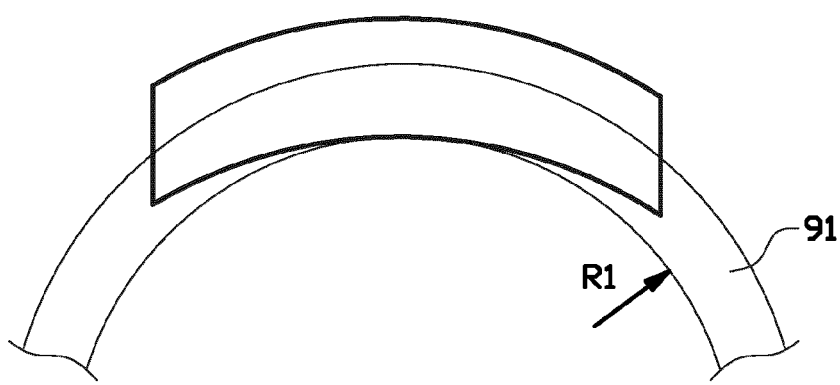

As shown in FIGS. 2, 3 and 4, the bead retaining device 10 further comprises a drive assembly 3 for driving the movement of the bead retaining members 6 relative to the frame 2. The drive assembly 3 comprises a plurality of linear actuators 30 for driving the movement of each of the bead retaining members 6 in the radial direction R. In this example, each linear actuator comprises a set of a pinion 31 and a rack 32 mounted between the frame 2 and a respective one of the bead retaining members 6. As shown in FIG. 7, the drive assembly 3 further comprises a plurality of planet gears 34 at the rear of the frame 2, each associated with a respective one of the pinions 31 at the front of the frame 2, and a ring gear 35 for driving the planet gears 34. The ring gear 35 is supported by support rollers 36 associated with the annular frame 2. The drive assembly 3 is further provided with a drive 4 for driving the rotation of the ring gear 35. Hence, all of the planet gears 34 can be moved synchronously to operate the movement of the bead retaining members 6 between the first radial position, as shown in FIG. 3, and the second radial position, as shown in FIG. 4. Preferably, the bead retaining members 6 are each mounted to the respective drive assemblies 3 thereof via a biasing member 38. Said biasing members 38 are configured to bias the bead retaining members 6 away from the drive assemblies 3 in a direction transverse to the retaining plane P.

Figure 5:
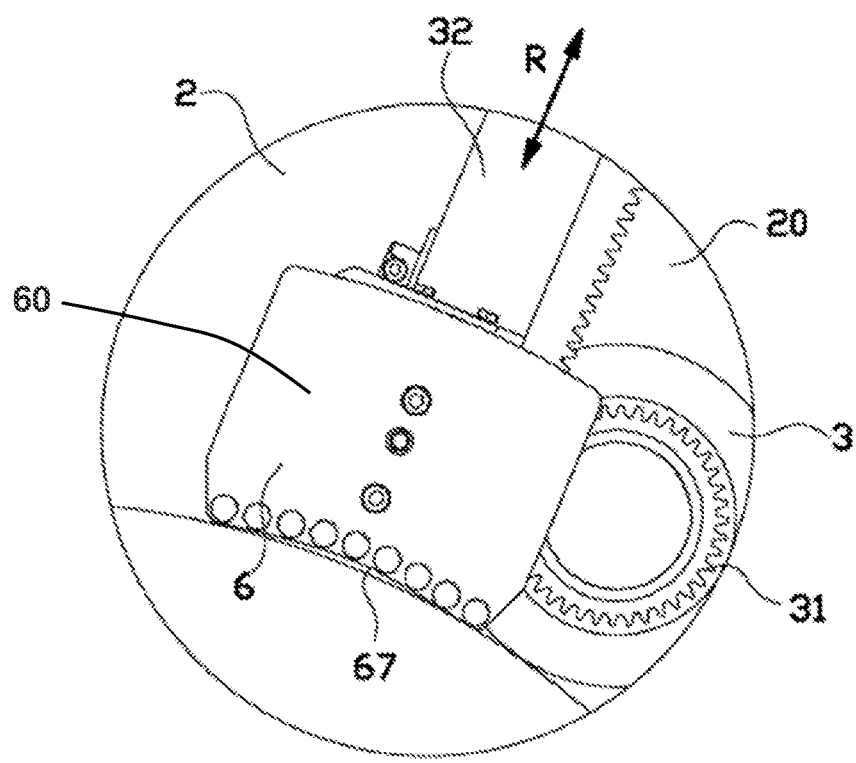
FIG. 5 show a detail of the first bead retaining device according to the circle V in FIG. 3 and the circle VI in FIG. 4, respectively.
Figure 6:
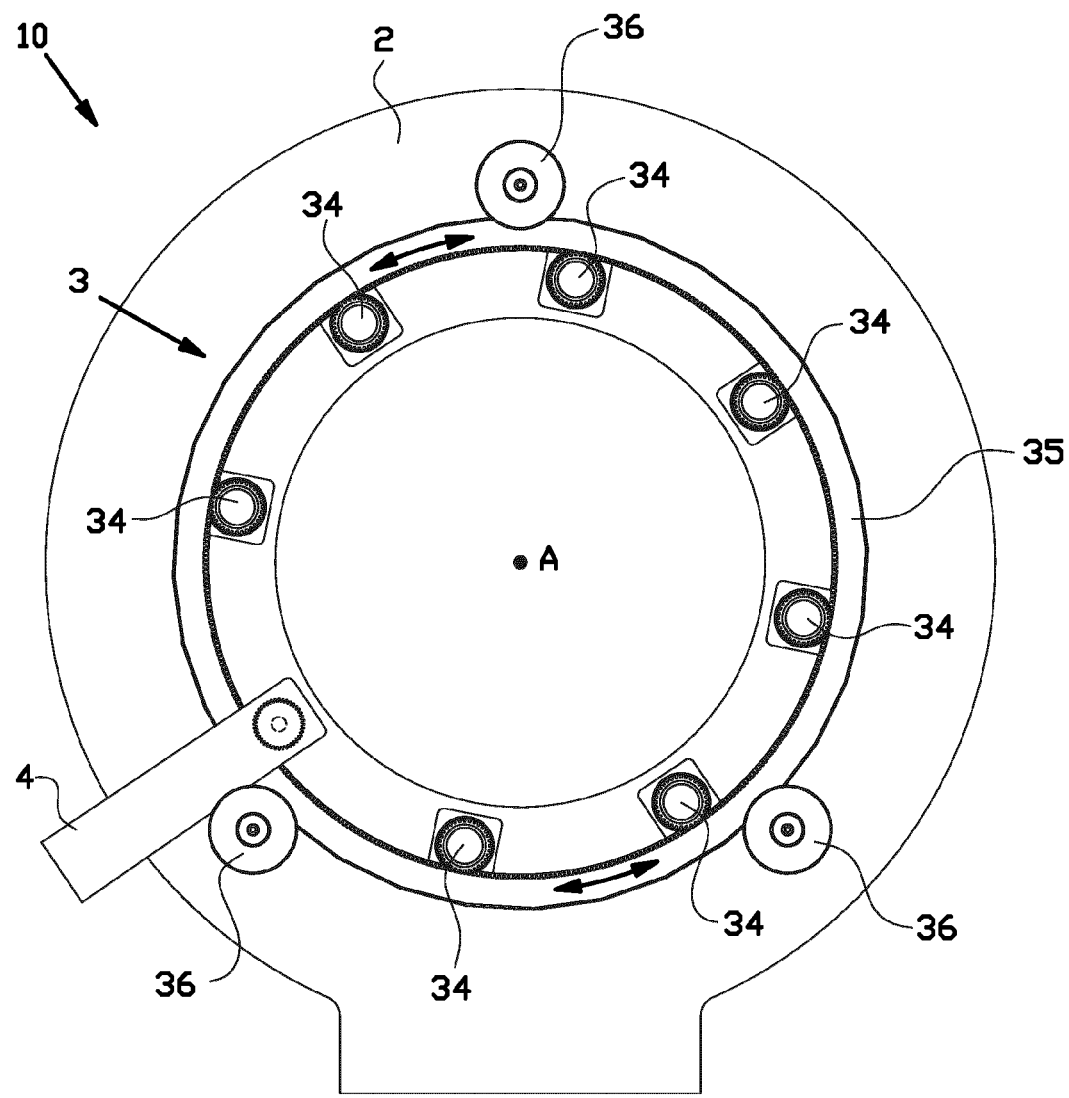
FIG. 6 shows a rear view of the first bead retaining device.

FIG. 5 shows one of the bead retaining members 6 in more detail. The bead retaining member 6 as shown is representative for the other retaining members 6. The bead retaining member 6 comprises a body 60. In this exemplary embodiment, the retaining elements 61 are magnets, preferably permanent magnets. The body 60 is a plate like or substantially plate like body. The body 60 defines the retaining surface S of the bead retaining member 6. The body 60 comprises a first concave edge 67 extending in the retaining plane P. The first concave edge 67 is facing radially inwards, i.e. in the radial direction R towards the central axis A.

The bead retaining member 6 comprises a plurality of retaining elements 61 distributed over the body 60 and extending along the first concave edge 67 for retaining the bead 9 as close as possible to said first concave edge 67. Alternatively, the bead retaining member 6 may comprise a single retaining element, i.e. a permanent magnet manufactured out of a single piece of material, extending along said first concave edge 67. In this exemplary embodiment, the plurality of retaining elements 61 are circular. Alternatively, the retaining elements 61 may be non-circular, i.e. rectangular or any other shape optimized for retaining the bead 91-93 as close as possible to the first concave edge 67.

Figure 8:
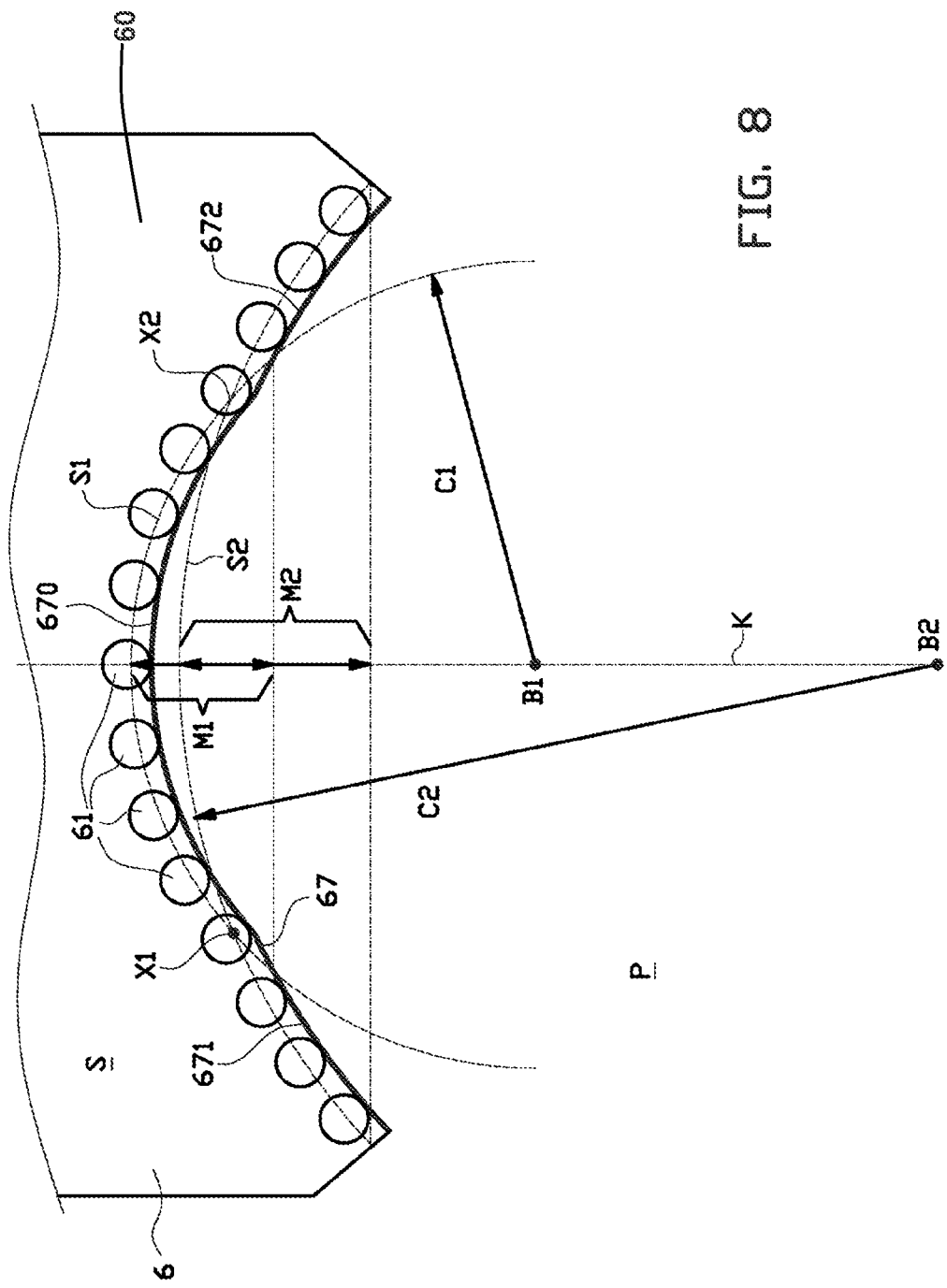
FIGS. 8 and 9A-9C show a front view of one of the bead retaining member according to FIG. 5.
Figure 9A:
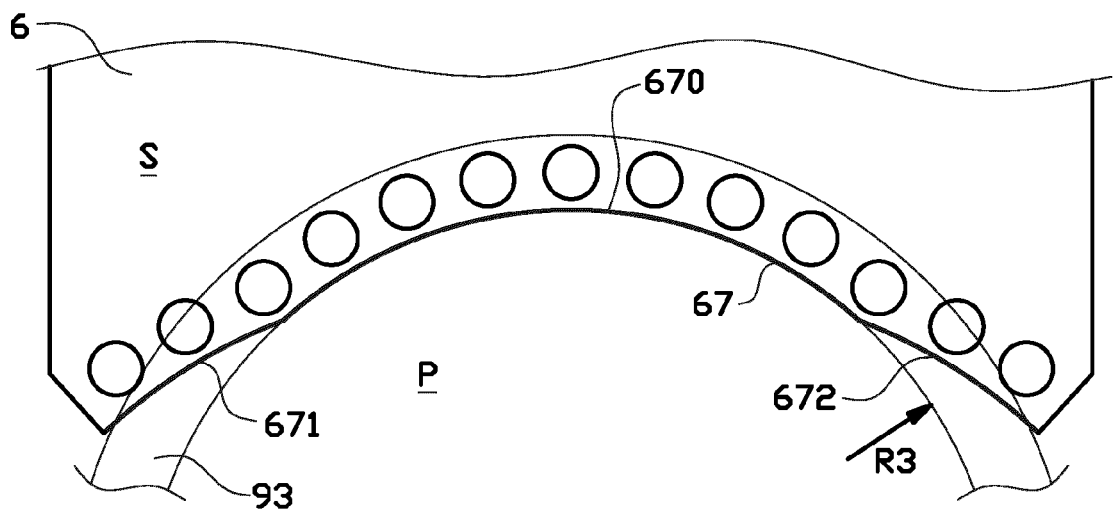
Figure 9B:
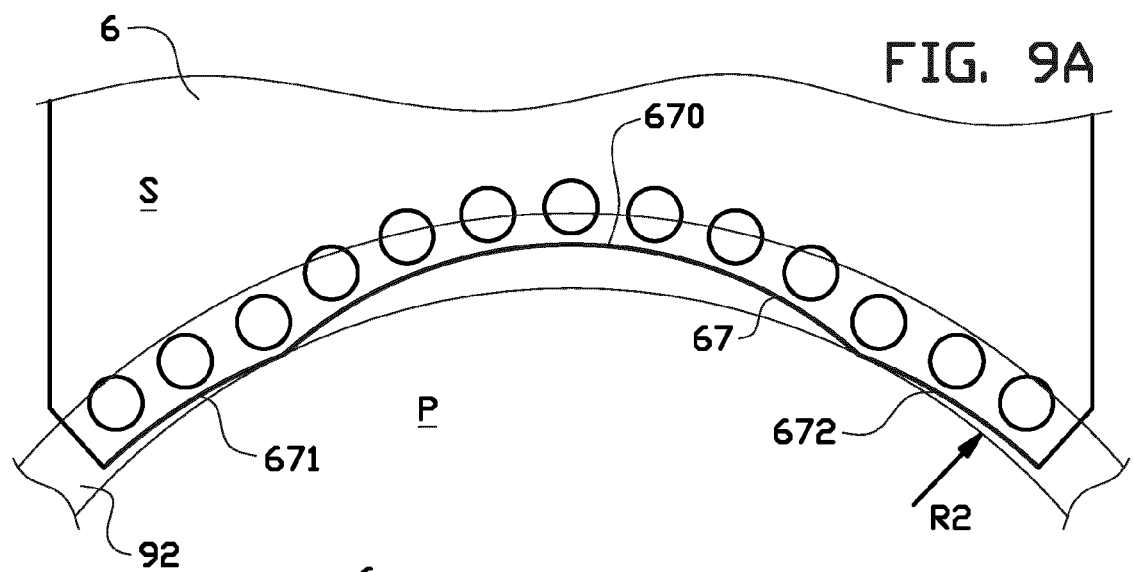
Figure 9C:
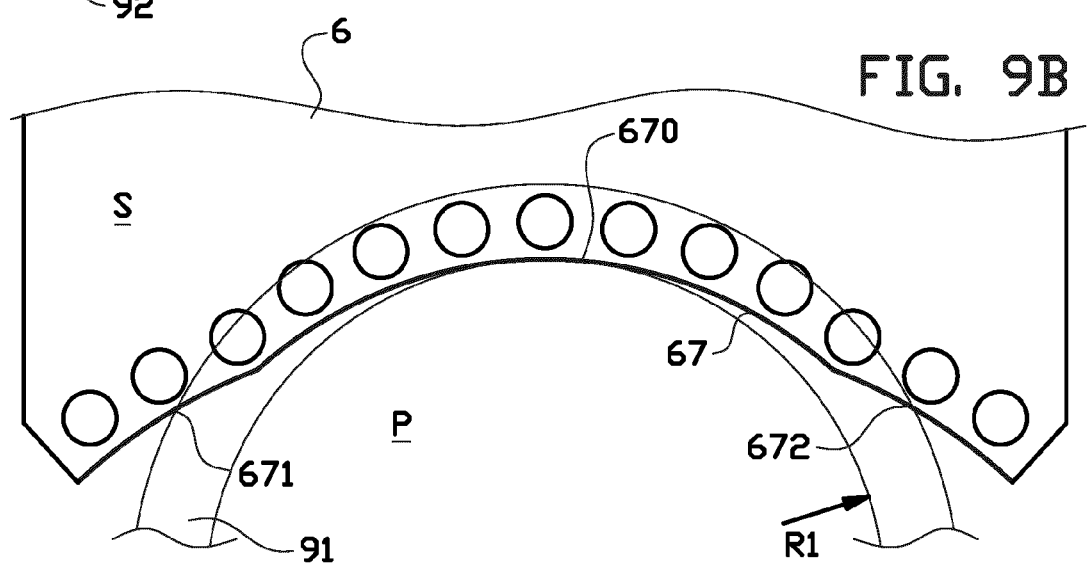

When looking closely at FIG. 5, one may observe that the first concave edge 67 is non-circular. The non-circularity enables the bead retaining member 6 to more reliably retain beads 91-93 with different radii. FIG. 8 schematically shows the bead retaining member 6 with an exaggerated non-circularity. In particular, one can now clearly distinguish a center region 670 and two lateral regions 671, 672 extending along and/or defined by a first retaining curve S1 and a second retaining curve S2 with different radii. Note that the difference in radii between the first retaining curve S1 and the second retaining curve S2 is highly exaggerated and does not represent the dimensions of the actual bead retaining member 6 as shown in FIG. 5. The schematic representation of FIGS. 8 and FIGS. 9A-9C is therefore only to be used for understanding the basic working principle of the non-circular first concave edge 67 and not for deriving any dimensions or ratios.

As shown in FIG. 8, the first retaining curve S1 is defined by at least a part of the plurality of retaining elements 61, in particular the retaining elements 61 which are located in the central region 670. In this exemplary embodiment, the first retaining curve S1 extends through the centers of the circular retaining elements 61 in the central region 670. In other words, the first retaining curve S1 represents the curvature along which a bead 91-93 with a radius similar to the radius of the first retaining curve S1 may be retained along the respective retaining elements 61. The first retaining curve S1 has a first retaining radius C1. The first retaining radius C1 is a constant radius.

The second retaining curve S2 is defined by at least a part of the plurality of retaining elements 61, in particular the retaining elements 61 which are located in the two lateral regions 671, 672 outside of the center region 670. In this exemplary embodiment, the second retaining curve S2 extends through the centers of the circular retaining elements 61 in the lateral regions 671, 672. In other words, the second retaining curve S2 represents the curvature along which a bead 91-93 with a radius similar to the radius of the second retaining curve S2 may be retained along the respective retaining elements 61. The second retaining curve S2 has a second retaining radius C2. The second retaining radius C2 is a constant radius.

In case of non-circular retaining elements (not shown), the first retaining curve S1 and the second retaining curve S2 may be located closer to or even coincide with at least a part of the first concave edge 67, i.e. where said first concave edge 67 is concentric and/or tangent to the first concave edge 67. However, an alternative embodiment may be envisioned in which the first concave edge 67 is profiled, serrated and/or closely follows the contours of the retaining elements 61, i.e. with cut-outs or recesses between the retaining elements 61, in which case the first retaining curve S1 and the second retaining curve S2 may be spaced apart from the first concave edge 67.

In any case, the first retaining curve S1 and the second retaining curve S2 are virtual curvatures that meet the following requirements:

1) the first retaining curve S1 and the second retaining curve S2 intersect at a first intersection point X1 and a second intersection point X2 spaced apart from the first intersection point X1, wherein the first center region 670 of the first concave edge 67 is located between said first intersection point X1 and said second intersection point X2. The first lateral region 671 is located opposite the first center region 670 with respect to the first intersection point X1 and the second lateral region 672 is located opposite the center region 670 with respect to the second intersection point X2;

2) the first concave edge 67 is located radially outside of the second retaining curve S2 in the first center region 670; and 3) the first edge is located radially outside of the first retaining curve S1 in the first lateral region 671 and the second lateral region 672.

In the exemplary embodiment as shown in FIG. 8, the first concave edge 67 is symmetrical in the first lateral region 671 and the second lateral region 672 about a plane of symmetry K in the first center region 670.

The first lateral region 671, the first center region 670 and the second lateral region 672 are distinct regions of the first concave edge 67, i.e. with an abrupt change in direction of the first concave edge 67 at the transitions between the regions 670, 671, 672. Alternatively, the transition or transitions between two adjacent regions 670, 671, 672 may be smooth. For example, the first concave edge 67 may be shaped as a parabola or a hyperbola.

In this example, the first concave edge 67 is concentric or at least partly concentric to the first retaining curve S1 in the first center region 670. Preferably, in the first central region 670, the first concave edge 67 extends along the first retaining curve S1 within a range of less than three millimeters from said first retaining curve S1. Similarly, the first concave edge 67 may be concentric or at least partially concentric to the second retaining curve in said first lateral region 671 and/or said second lateral region 672. Preferably, in the first lateral region 671 and/or the second lateral region 672 the first concave edge 67 extends along the second retaining curve S2 within a range of less than three millimeters from said second retaining curve S2.

As further shown in FIG. 8, the part of the first retaining curve S1 that extends within the body 60 defines a first middle ordinate M1. The part of the second retaining curve S2 that extends within the body 60 defines a second middle ordinate M2. In this particular embodiment, said first middle ordinate M1 and said second middle ordinate M2 are in line. In FIG. 8, the second middle ordinate M2 is shown Preferably, the second middle ordinate M2 only partially overlaps the first middle ordinate M1.

In an alternative formulation of the retaining curves S1, S2, independent from the intersection points X1, X2, it can be observed in FIG. 8 that the first retaining curve S1 is a part of a circle with a first center B1 and the second retaining curve S2 is part of a circle with a second center B2. The first center B1 is located closer to the first concave edge 67 than the second center B2, considered in a radial direction R through both centers B1, B2.

In the actual retaining member 6 as shown in FIG. 5, the second retaining radius C2 is at least five percent larger than the first retaining radius C1.

Figure 10:
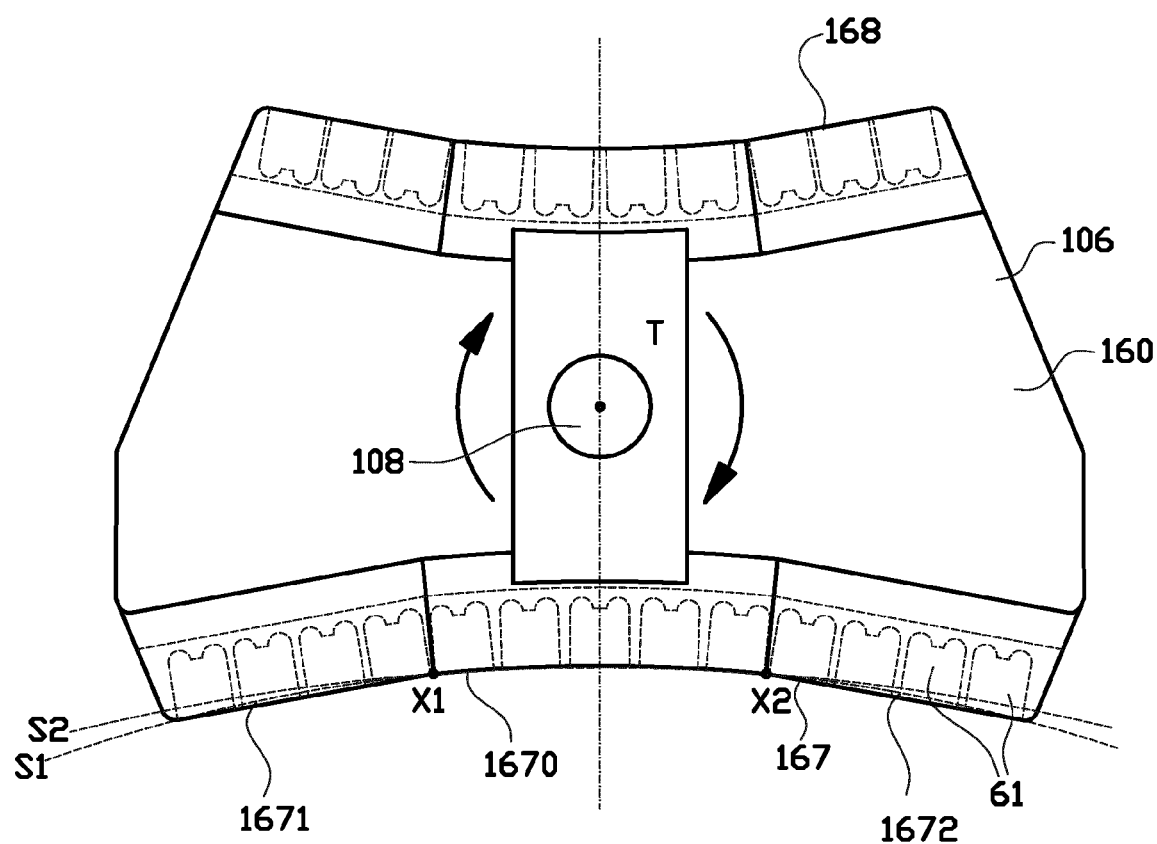
FIG. 10 shows a front view of an alternative, reversible bead retaining member according to a second embodiment of the invention.

FIG. 10 shows an alternative retaining member 106 according to a second embodiment of the present invention. As is shown in FIG. 10, the first lateral region 1671 and the second lateral region 1672 may alternatively form straight sections. In other words, the first concave edge 167 at the first lateral region 1671 and the second lateral region 1672 is not curved. Consequently, the retaining elements 161 are arranged side-by-side in a substantially linear array. However, despite the linearity, a second retaining curve S2 can be drawn through the retaining elements 161 of the first lateral region 1671 and the second lateral region 1672 that meet the requirements mentioned above. Said alternative retaining member 106 further comprises a second concave edge 168 at an opposite end of the body 160 relative to the first concave edge 167. The second concave edge 168 may define one or more further retaining curves (not shown) with different radii than the first retaining curve S1 and the second retaining curve S2 to allow for an even greater flexibility and/or an even greater range when retaining beads 91-93 with different radii.

In a further alternative embodiment (not shown), the body of the bead retaining member may be three-sided or four-sided and optionally have three or more concave edges which can be rotated into position in the same way as the previously discussed two concave edges 167, 168.

Figure 11:
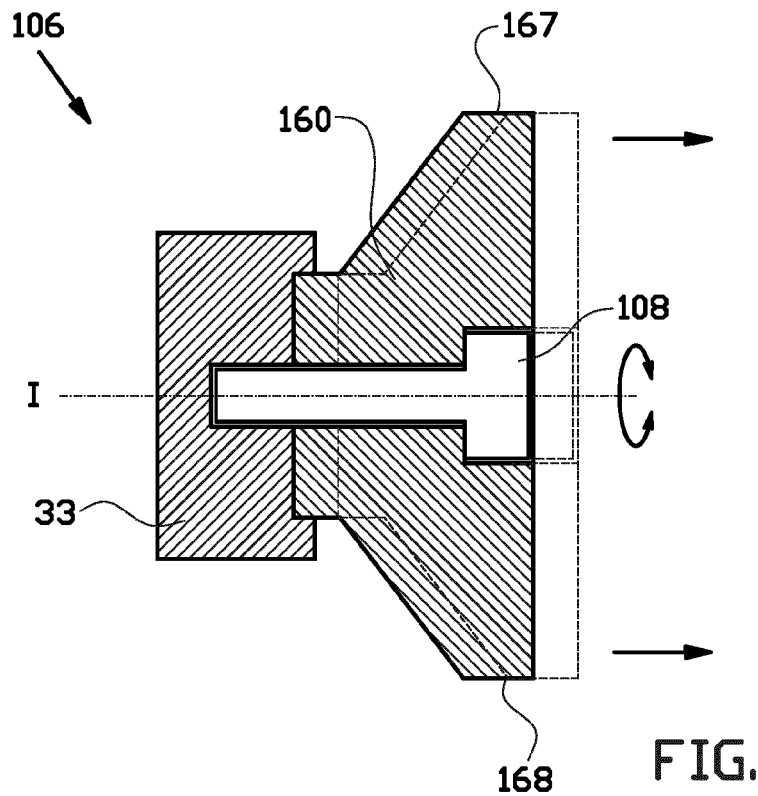
FIG. 11 shows a section view of the alternative bead retaining member according to FIG. 10.

As shown in FIG. 11, the bead retaining member 106 is arranged to be mountable to a mounting member 33 in two orientations, i.e. a first orientation in which the first concave edge 167 is facing towards the central axis A and a second orientation in which the second edge 168 is facing towards the central axis A. In particular, the bead retaining member 106 is arranged to be reversible, invertible or rotatable about an inverting axis I perpendicular to the retaining plane P between said two orientations. The mounting member 33 and/or the body 160 of the bead retaining member 106 may be suitably shaped so that they fit and/or engage in said two orientations only. Depending on the amount of edges and/or sides, the mounting member 33 may be arranged to receive the bead retaining member 106 in more than two orientations.

Preferably, the bead retaining device 10 may be configured for switching the orientation of the bead retaining members 106 according to the second embodiment of the invention without removing said retaining members 106 from the bead handling device 10. In this example, each retaining members 106 is mounted to the mounting member 33 with a fastener 108, in particular a bolt, which can be partially loosened, to allow the bead retaining member 106 to move between a fixed state, in which the orientation of the bead retaining member 106 with respect to the mounting member 33 and/or the frame 2 is fixed, and a loosened state, in which the fastener 108 is partially loosened and/or released. The bolt may over a few windings, to reduce the clamping force exerted by the bolt on the bead retaining member 106 to allow said retaining member 106 to be rotated relative to the mounting member 33 into a different orientation.

Figure 12:
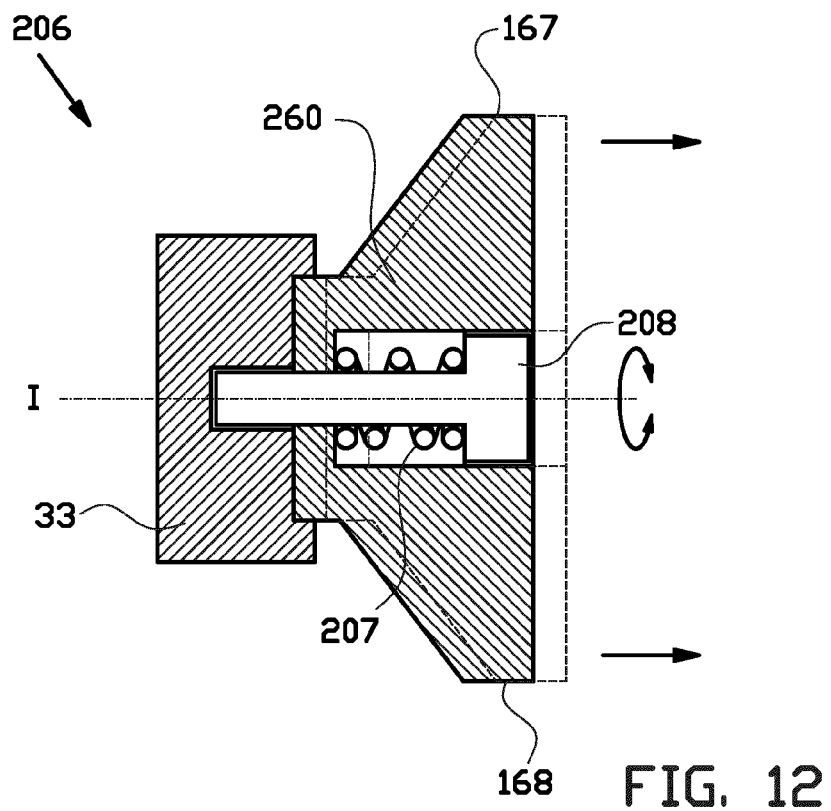
FIG. 12 shows a section view of a further alternative bead retaining member according to a third embodiment of the invention.

FIG. 12 shows a further alternative retaining member 206 according to a third embodiment of the present invention, that differs only from the previously discussed alternative retaining member 106 in that the body 260 of the bead retaining member 206 is movable relative to the fastener 208 in a direction away from the mounting member 33 into the partially loosened state and in that the bead retaining member 206 is further provided with a spring 207 or another suitable biasing member to bias the body 260 against the fastener 208. The bead retaining member 206 can thus be manually pushed against the bias of the spring 207 into the loosened state to at least partially release the body 260 from the engagement with the mounting member 33, after which the bead retaining member 206 can be rotated to another orientation.

It will be clear that the ability of the aforementioned alternative retaining members 106, 206 to be inverted, reversed or rotated about the inverting axis I can be applied independently from the characteristics of the first concave edge 167 and the second concave edge 168. In particular, the concave edges may alternatively be simple, conventional single radius and/or circular edges.

Figure 13:
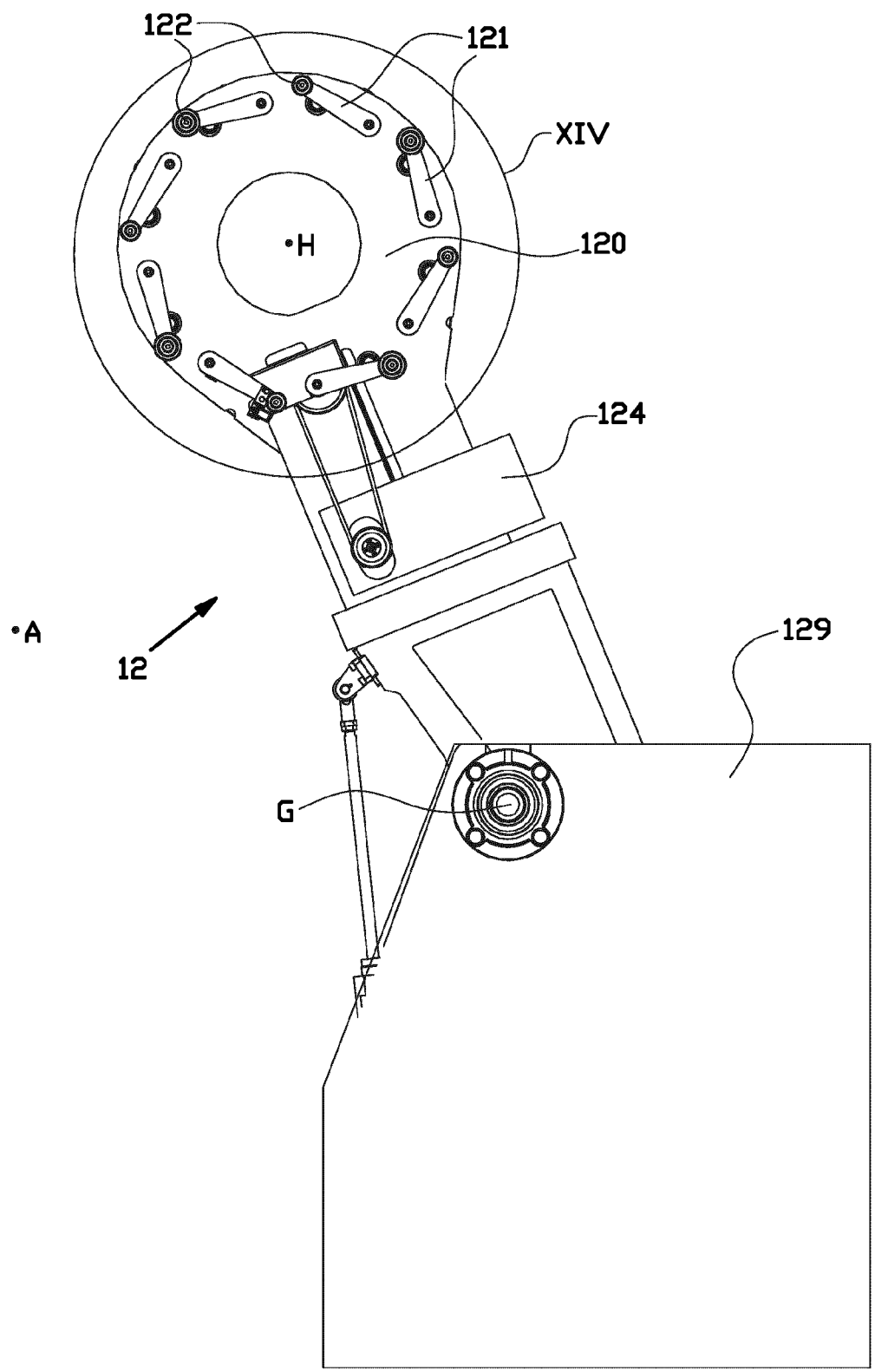
FIG. 13 shows a front view of the bead loader according to the line XIII-XIII in FIGS. 1.
Figure 14:
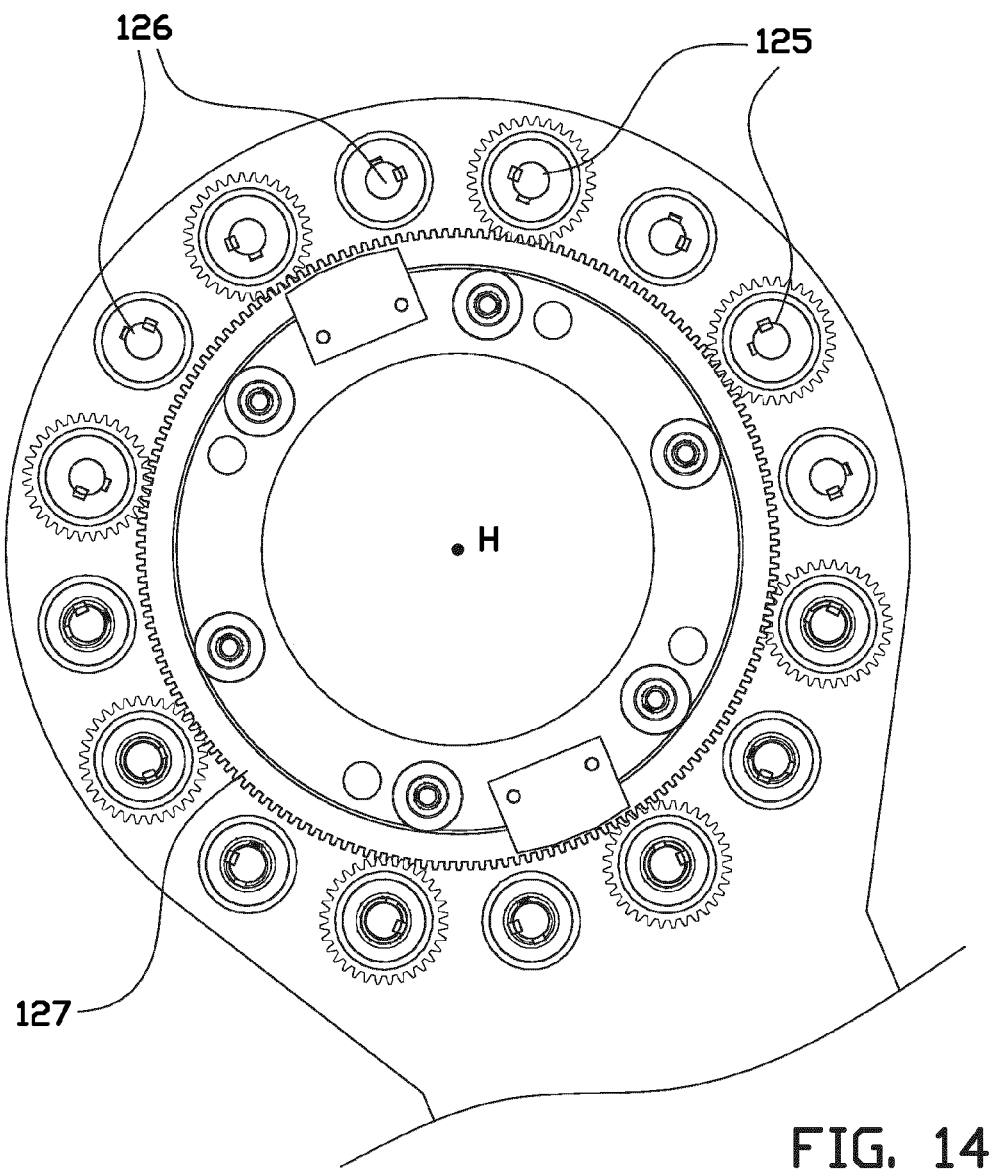
FIG. 14 shows a section view of the bead loader according to the line XIV-XIV in FIG. 1.

The bead transfer device 12 is shown in FIG. 1 and in more detail in FIGS. 13 and 14. The bead transfer device 12 comprises a base 129 and a frame 120 that is movable with respect to said base 129 in a plane transverse or perpendicular to the central axis A. In particular, the frame 120 is rotatable with respect to the base 129 about a transfer device rotation axis G parallel or substantially parallel to the central axis A.

As schematically shown in FIG. 1, the bead transfer device 12 comprises at a first side of the frame 120 a plurality of first support members 122 for supporting a bead 91-93 and transferring said bead 91-93 to the first bead retaining device 10. The bead transfer device 12 further comprises a plurality of second support members 123 at a second side of the frame 120 opposite to the first side for supporting a bead 91-93 and transferring said bead 91-93 to the second bead retaining device 11. In particular, the support members 122, 123 are arranged to support a bead 91-93 by engaging a radial inner side of said bead 91-93.

As is shown in FIG. 13, the frame 120 extends circumferentially about a frame axis H. The frame 120 is movable into an operative position, as shown in FIG. 1, in which the frame axis H is in line with the central axis A. The first support members 122 and the second support members 123 are arranged circumferentially about the frame axis H. The support members 122, 123 are radially movable inward and/or outward with respect to the frame axis H for supporting beads 91-93 of different sizes.

FIG. 14 shows a section view of the frame 120 of the bead transfer device 12. The bead transfer device 12 comprises a gear ring 127 and planet gears 125, 126 distributed circumferentially about the frame axis H. The planet gears comprise first planet gears 125 associated with the first support members 122 for controlling a radial position of said first support members 122 and second planet gears 126 associated with the second support members 123 for controlling a radial position of said second support members 123. The first planet gears 125 and the second planet gears 126 are arranged alternately in circumferential direction. The first planet gears 125 and the second planet gears 126 are in engagement with the gear ring 127 to form a planetary gear system. Alternatively, the first planet gears 125 may be in engagement with the gear ring 127 to form a first planetary gear system, while the second planet gears 126 are in engagement with a further gear ring (not shown) to form a second planetary gear system. Hence, the first support members 122 and the second support members can be controlled independently from each other. The gear ring 127 is driven by an actuator 124. Said actuator 124 may for example be a servomotor or a step motor.

As is shown in FIG. 13, the first support members 122 are eccentrically connected to the first planet gears 125 via rotatable arms 121, to be moved eccentrically about the first planet gears 125 when said first planet gears 125 are rotated by the gear ring 127.

In a similar manner, the second support members 123 are connected to the second planet gears 126. Alternatively, the support members 122, 123 can be functionally connected to the associated planet gears 125, 126 via gear racks in a manner similar to the configuration of the bead retaining device 10 as shown in FIGS. 2-5.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In summary, the invention relates to a bead retaining member comprising a body having a concave first concave edge, wherein the bead retaining member further comprises one or more retaining elements which are distributed over the body along said first concave edge for retaining a first bead of a first size along a first retaining curve having a first retaining radius and for retaining a second bead of a second size along a second retaining curve having a second retaining radius larger than the first retaining radius, wherein the first retaining curve intersects with the second retaining curve at a first intersection point and a second intersection point, wherein the first concave edge is non-circular and is located radially outside of the second retaining curve in a center region of the first concave edge between the first intersection point and the second intersection point and radially outside of the first retaining curve in a first lateral region and a second lateral region.

The invention claimed is:

1. A bead retaining device comprising a plurality of bead retaining members for retaining a bead in a retaining plane,
   wherein the bead retaining device further comprises an annular frame extending circumferentially about a central axis perpendicular to the retaining plane,
   wherein the annular frame has an inner frame edge that forms a frame opening for receiving a tire building drum,
   wherein the bead retaining members are movable in a radial direction perpendicular to the central axis between a first radial position at or inside the frame opening and a second radial position radially inward with respect to said first radial position,
   wherein the bead retaining members each comprise a body having a concave first concave edge extending in said retaining plane,
   wherein the bead retaining members each further comprise one or more retaining elements which are distributed over the body along said first concave edge for retaining a first bead of a first size along a first retaining curve having a first retaining radius and for retaining a second bead of a second size along a second retaining curve having a second retaining radius larger than the first retaining radius,
   wherein the first retaining curve intersects with the second retaining curve at a first intersection point and a second intersection point spaced apart from the first intersection point,
   wherein the first concave edge is non-circular and is located radially outside of the second retaining curve in a center region of the first concave edge between the first intersection point and the second intersection point and radially outside of the first retaining curve in a first lateral region of the first concave edge opposite the center region with respect to the first intersection point and a second lateral region of the first concave edge opposite to the center region with respect to the second intersection point,
   wherein the first retaining curve is concentric to the central axis in one radial position of the bead retaining members between the first radial position and the second radial position and the second retaining curve is concentric to the central axis in another radial position between the first radial position and the second radial position.

2. The bead retaining device according to claim 1, wherein the bead retaining device further comprises a drive assembly for driving the plurality of bead retaining members relative to the annular frame in a radial direction.

3. The bead retaining device according to claim 1, wherein the drive assembly comprises a plurality of linear actuators for driving the movement of each of the bead retaining members in the radial direction.

4. The bead retaining device according to claim 3, wherein each of the linear actuators comprises a set of a pinion and a rack mounted between the annular frame and a respective one of the bead retaining members.

5. The bead retaining device according to claim 1, wherein the drive assembly further comprises a plurality of planet gears, each associated with a respective one of the pinions, and a ring gear for driving said planet gears.

6. The bead retaining device according to claim 1, wherein the first concave edge is at least partially concentric to the first retaining curve in the center region.

7. The bead retaining device according to claim 1, wherein the first concave edge is at least partially concentric to the second retaining curve in the first lateral region or the second lateral region.

8. The bead retaining device according to claim 1, wherein the second retaining radius is at least five percent larger than the first retaining radius.

9. The bead retaining device according to claim 1, wherein the first concave edge in the center region extends along the first retaining curve within a range of less than three millimeters from said first retaining curve.

10. The bead retaining device according to claim 1, wherein the first concave edge in the first lateral region or the second lateral region extends along the second retaining curve within a range of less than three millimeters from said second retaining curve.

11. The bead retaining device according to claim 1, wherein the first concave edge is symmetrical in the first lateral region and the second lateral region about a plane of symmetry in the center region.

12. The bead retaining device according to claim 1, wherein the part of the first retaining curve that extends within the body defines a first middle ordinate,
wherein the part of the second retaining curve that extends within the body defines a second middle ordinate that is in-line with the first middle ordinate.

13. The bead retaining device according to claim 12, wherein the second middle ordinate only partially overlaps with the first middle ordinate.

14. The bead retaining device according to claim 1, wherein the body further comprises a second concave edge extending in the retaining plane.

15. The bead retaining device according to claim 14, wherein the body is rotatable about an inverting axis perpendicular to the retaining plane such that the first concave edge and the second concave edge can interchange positions.

16. The bead retaining device according to claim 1, wherein the one or more retaining elements are magnets.

17. A bead handling assembly comprising the bead retaining device according to claim 1 and a tire building drum that has an outer diameter,
wherein the first radial position and the second radial position are both located in the annular frame opening inside the inner frame edge and outside the outer diameter.

18. The bead handling assembly according to claim 17, further comprising a bead loader for supplying the beads to the bead retaining device.

19. A bead retaining device comprising a bead retaining member for retaining a bead in a retaining plane,
wherein the bead retaining device further comprises an annular frame extending circumferentially about a central axis perpendicular to the retaining plane,
wherein the bead retaining member comprises a body having a concave first concave edge and a second concave edge extending in said retaining plane,
wherein the body is rotatable about an inverting axis perpendicular to the retaining plane such that the first concave edge and the second concave edge can interchange positions,
wherein the bead retaining member further comprises one or more retaining elements which are distributed over the body along said first concave edge for retaining a first bead of a first size along a first retaining curve having a first retaining radius,
wherein the bead retaining device comprises a mounting member for receiving the bead retaining member at the annular frame in at least two orientations about the inverting axis,
wherein the bead retaining member is movable between a fixed state in which the orientation of the bead retaining member about the inverting axis is fixed with respect to the mounting member and a partially loosened state in which the bead retaining member is rotatable about the inverting axis relative to the mounting member.

20. The bead retaining device according to claim 19, wherein the bead retaining member is movable with respect to the annular frame in a direction transverse to the retaining plane,
wherein the bead retaining device further comprises one or more biasing members for biasing the bead retaining member away from the annular frame in a direction transverse to the retaining plane.

21. The bead retaining device according to claim 19, wherein the bead retaining device comprises a fastener for fixing and partially loosening the bead retaining member with respect to the mounting member.

22. The bead retaining device according to claim 19, wherein the bead retaining device comprises a fastener for mounting the bead retaining member to the mounting member,
wherein the bead retaining member is movable with respect to the fastener between the fixed state and the partially loosened state,
wherein the bead retaining device further comprises a biasing member for biasing the bead retaining member into the fixed state.

23. The bead retaining device according to claim 22, wherein the biasing member is a spring.

24. The bead retaining device according to claim 21, wherein the fastener is a bolt.

25. The bead retaining device according to claim 19, wherein the one or more retaining elements that are distributed over the body along the first concave edge are further arranged for retaining a second bead of a second size along a second retaining curve having a second retaining radius larger than the first retaining radius,
wherein the first retaining curve intersects with the second retaining curve at a first intersection point and a second intersection point spaced apart from the first intersection point,
wherein the first concave edge is non-circular and is located radially outside of the second retaining curve in a center region of the first concave edge between the first intersection point and the second intersection point and radially outside of the first retaining curve in a first lateral region of the first concave edge opposite the center region with respect to the first intersection point and a second lateral region of the first concave edge opposite to the center region with respect to the second intersection point.

* * * * *